(12) United States Patent
Ubillos

(10) Patent No.: US 7,350,148 B2
(45) Date of Patent: *Mar. 25, 2008

(54) SPLIT EDITS

(75) Inventor: Randy Ubillos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 987 days.

This patent is subject to a terminal disclaimer.

(21) Appl. No.: 10/635,881

(22) Filed: Aug. 5, 2003

(65) Prior Publication Data

US 2004/0046782 A1    Mar. 11, 2004

Related U.S. Application Data

(63) Continuation of application No. 09/285,482, filed on Apr. 2, 1999, now Pat. No. 6,621,503.

(51) Int. Cl.
*G06F 3/00* (2006.01)
*G06F 15/00* (2006.01)

(52) U.S. Cl. ...................... 715/723; 715/765

(58) Field of Classification Search ........ 715/723–726, 715/719, 764–765, 819, 810, 762, 853
See application file for complete search history.

(56) References Cited

U.S. PATENT DOCUMENTS

| 5,754,851 | A | * | 5/1998 | Wissner | 345/302 |
| 5,760,767 | A | * | 6/1998 | Shore et al. | 715/723 |
| 6,052,508 | A | * | 4/2000 | Mincy et al. | 386/96 |
| 6,219,048 | B1 | * | 4/2001 | Miller et al. | 345/764 |

* cited by examiner

*Primary Examiner*—Cao (Kevin) Nguyen
(74) *Attorney, Agent, or Firm*—Blakely, Sokoloff, Taylor & Zafman LLP

(57) ABSTRACT

A method and apparatus is described that is related to split editing. An indicia of a first time based stream of information is displayed at a source media. An indicia of a second time based stream of information is displayed at the source media. This is followed by an editing of the first time based stream of information and the second time based stream of information together in an operation that uses no more than six edit points between the source media and a destination media combined. The editing is performed such that the selected amount of time of the first time based stream of information differs from the selected amount of time of the second time based stream of information, and the destination media includes a third time based stream of information.

36 Claims, 8 Drawing Sheets

SPLIT EDITS

This application is a continuation application of U.S. Pat. application Ser. No. 09/285,482, filed Apr. 2, 1999 now U.S. Pat. No. 6,621,503.

BACKGROUND

I. Field of the Invention

The present invention relates to media editing. In particular, the present invention relates to split editing.

II. Related Art

Editing is generally the art of making subtle adjustments to a material or materials in a form that communicates a message with maximum impact. In the area of video editing, the editor defines and shapes the video and/or audio until the message to be delivered is accomplished. Generally, video editing may be divided into two categories: linear video editing and non-linear video editing. In linear video editing, the images are taken in a sequential order. Stated differently, one idea after another must be previously conceived and then, the video is taken in the conceived chronological sequence. For example, suppose a video is to be taken of an office, the editor must first conceptualize as to what the scenes would be and in which sequence. The editor may want to take a video of an entry into the Office. This scene perhaps followed by a focus on a pot plant in a corner. The scene may then move to the various articles on a desk and then, the scene shifting its focus to a window. In linear video editing, this is the precise sequence the video must be taken.

By contrast, in non-linear video editing, scenes may be taken in any order and later edited according to a desired sequence. Whether linear video editing or non-linear video editing approach is to be taken generally depends on the video system that is to be used. While non-linear video editing system may be more complicated, the advantage is that the video may be taken in any sequence and later, through careful observation of the video and a thoughtful process, the video may be manipulated to communicate the message in the manner the editor wishes to convey with maximum impact. Due to its free format, the editor can readily impute creativity without being constrained physically.

With the advancement of computer technology, further improvements have been made to the video editing system through a process called digitization. In particular, the digitization of video has had a profound impact on non-linear video editing system. Previously, copies of a film containing the video would be made. By cutting and splicing the copies, an edited version of the original film was made. If the editor was not satisfied, further copies of the original film were made and the cutting and splicing would resume until a desired product was obtained. In a digital video editing system, video is stored in a storage medium such as magnetic discs or laser discs thereby allowing the video to be retrieved randomly and displayed on a display device such as a monitor. This alleviates the burdensome technique of cutting and splicing. Further, in random access, each image of the video operates independently, thus, it is possible to retrieve a particular image without sequentially going through other materials to reach the image. Examples of sequential access would be films or magnetic tapes. By allowing images to be accessed randomly, video can be easily manipulated into any desired sequence which is the heart of a non-linear video editing system.

One desired feature of the improved editing system is the ability to provide special effects to the message to be conveyed during the editing process. FIG. 1 is a flow chart that shows such feature. In block 10, an audio clip is retrieved to a source window to be edited. A clip is a basic unit of media that comprises movies, still images, nested sequences, video files and audio files. It may be desirable to edit the audio clip such that the audio in and/or the audio out is different from its corresponding video clip. For example, the audio clip may correspond to a video clip of a critic explaining a certain motion of a dance choreography. Using a three-point edit, the audio clip is edited to capture the explanation. A three-point edit is where a start point (also referred to as an in point) and an end point (also referred to as an out point) are specified and an in point is specified at a destination such as a destination window. Once the three-point edit is performed, in block 12, the edited portion of the audio clip is transferred to the destination window. In block 14, the corresponding video clip of the audio clip is separately retrieved to the source window to be edited. Using again the three-point edit, the video clip is edited such that when the critic is explaining the dance motion, that portion of the video clip is cut. This time duration difference between the audio clip and the video clip is known as split edit. Because the audio and video edit are done separately, the relationship between the two needs to be defined. Terms of art have evolved defining the relationship. For example, J-cut defines an edit where the audio clip starts earlier in time than the video clip. L-cut defines an edit where the audio clip ends later in time than the video clip. Block 18 shows this step. In block 16, the edited video clip is transferred to the destination window to be split edited with the edited audio clip. Note that in this split edit, the edited video clip cuts off while the corresponding audio clip continues on and thus, would be an L-cut. The two edited clips are then superimposed onto another video clip displaying the actual choreography with its accompanying audio clip. The end result is a composite video clip that initially displays the critic making comments of a dance choreography. When the critic is about to explain a certain motion, the video of the critic is replaced with the actual video of the dance motion. However, the voice of the critic continues on to comment on the motion. When the comments are finished, the audio is replaced with the audio corresponding to the video of the dance choreography.

The split edit process described above is burdensome because the audio clip and the video clip are edited separately, then combined with another video and audio clip. In certain instances, the editor manually calculates the video in, video out, audio in and the audio out of the split edit. This requires great effort on the part of the editor. Because the split edit process is burdensome, the editor may not desire to experiment with the various positions of video in, video out, audio in and audio out to get to the combination which the editor considers to convey the message with maximum impact, for example. It is desirable to provide a split edit feature that is simple to use and does not burden the editor allowing the editor to focus on editing with creativity and without distraction.

SUMMARY

A method and apparatus is described that is related to split editing. An indicia of a first time based stream of information is displayed at a source media. An indicia of a second time based stream of information is displayed at the source media. This is followed by an editing of the first time based stream of information and the second time based stream of information together in an operation that uses no more than six edit points between the source media and a destination media combined. The editing is performed such that the selected amount of time of the first time based stream of information differs from the selected amount of time of the second time based stream of information, and the destination media includes a third time based stream of information.

Other features and advantages of the present invention will be apparent from the accompanying drawings and detailed description to be followed.

BRIEF DESCRIPTION OF THE DRAWINGS

The present invention is illustrated by way of examples and not as limitations in the figures of the accompanying drawings in which.

DETAILED DESCRIPTION

Figure 1:
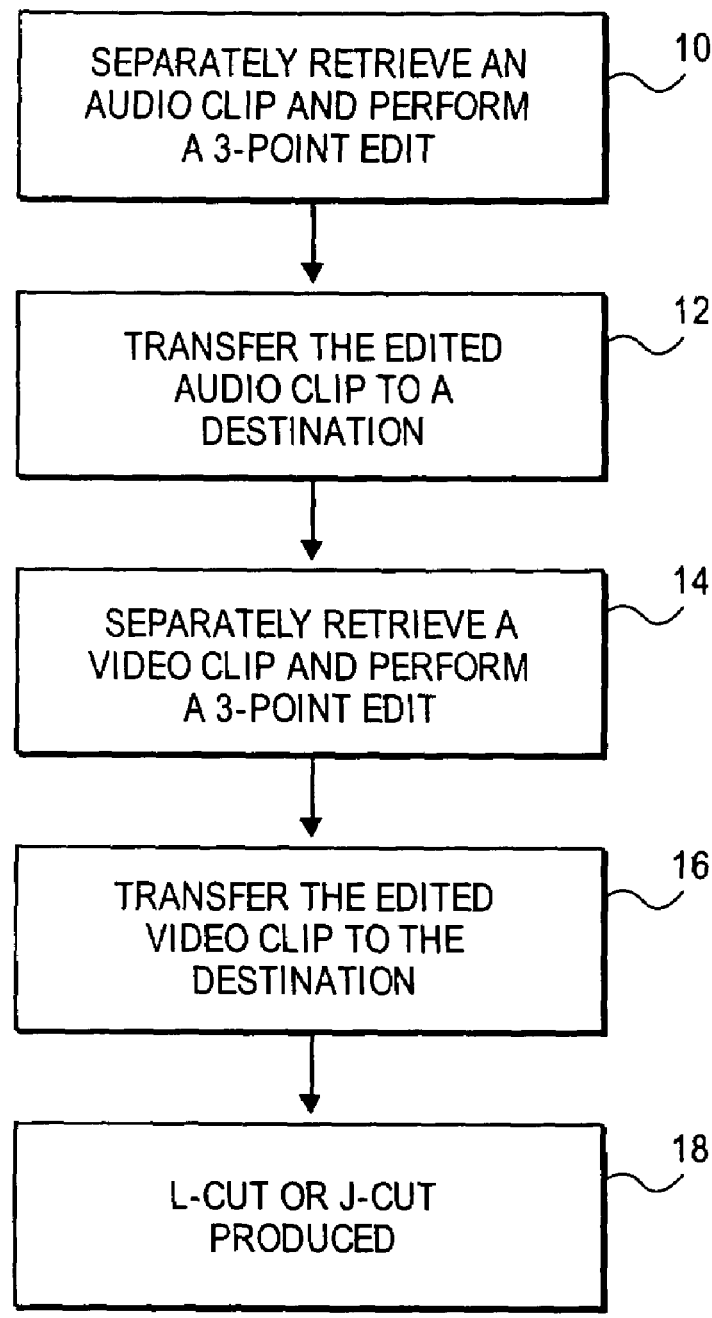
FIG. 1 is a flowchart of a method of producing a split edit.
Figure 2A:
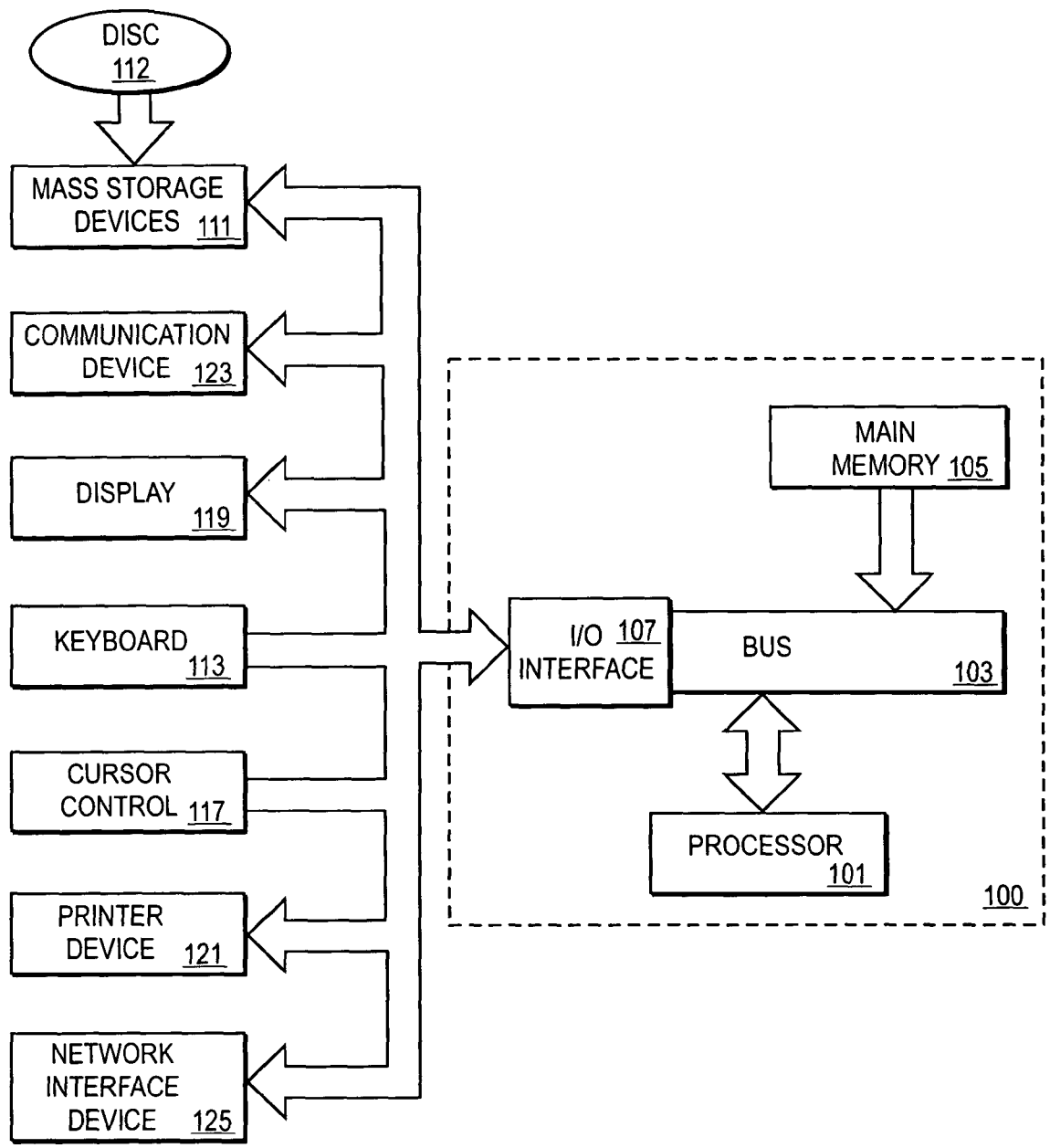
FIG. 2a is an example of a computer system in which an embodiment of the invention may be implemented.

FIG. 2a is an example of a computer system 100 in which an embodiment of the invention may be incorporated. The computer system 100 comprises a processor 101 coupled to a main memory 105 via a bus 103. The main memory 105 may be dynamic random access memories (DRAMs) or other suitable memories. Data and instructions are stored in the main memory 105 which are processed by the processor 101. Generally, coupled to the bus 103 is a read only memory (ROM) in which the basic input/output instructions (BIOS) are stored. Further coupled to the bus 103 are various controllers such as memory management unit (MMU), interrupt controller, video controller, direct memory access controller (DMA) and input/output(I/O) controller, among others, all which are not shown in the figure. Further coupled to the bus 103 is an I/O interface 107 to which the various I/O devices are coupled to. Examples of the I/O devices are mass storage devices 111 such as magnetic disc drives and/or optical disc drives, an alphanumeric input device 113 such as a keyboard, a cursor control device 117 such as a mouse or a trackball, a display device 119 such as a monitor or a liquid crystal display (LCD), a printer device 121 such as a printer, a communication device 123 such as a modem and a network interface device 125 such as ethernet.

The computer system 100 described above is readily available commercially. Preferably, The computer system 100 be one of the Macintosh® family of personal computers such as the Macintosh® Quadra™, Macintosh® Performa™, PowerMac® brand personal computers manufactured by Apple Computer®, Inc. of Cupertino, Calif. The processor 101 can be one of the Power PC family of microprocessors such as the 604 or G3 PowerPC® such as those manufactured by Motorola®, Inc. of Schaumburg, Ill. However, other systems and processors may be used. Generally, the present invention may be stored in a mass storage device 111 or a storage disc 112, which may be magnetic or optical, until such time the processor 101 retrieves from storage and down loads into the main memory 105 for processing.

Figure 2B:
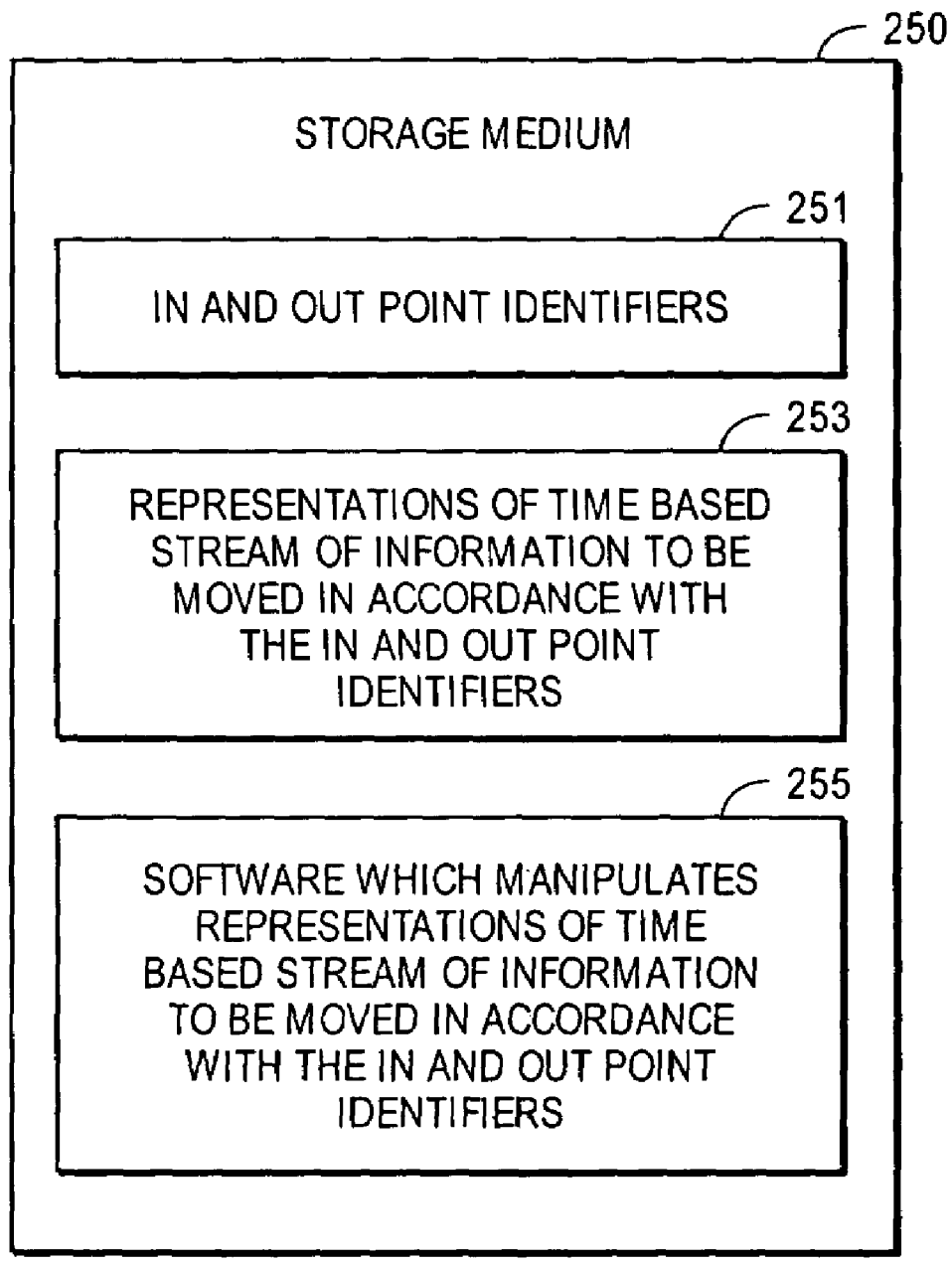
FIG. 2b is a diagram of a storage medium that contains an embodiment of the invention.

FIG. 2b is an example of a storage medium 250 which may be random access memory (RAM), hard disk, compact disc or magnetic disc, among others. The storage medium 250 comprises instructions and data codes for in and out point identifiers, illustrated as block 251, that allow various time based stream of information to split edited. Examples of in and out points are video in point and video out point, or audio in point and audio out point. Examples of a time based stream of information are video clip and audio clip. Block 253 illustrates the edited time based stream of information being moved in accordance with the in and out point identifiers. Block 255 illustrates an underlying software that manipulates the movement of the edited time based stream of information in accordance with the in and out point identifiers. A feature of the underlying software may be a "drag and drop" capability that allows an edited time base stream of information to be moved from one place to another. Additional details will be given in the passages to follow. Command selections and information to direct the flow of data and instructions to the processor 101 may be performed by a user via the alphanumeric device 113 and/or cursor control device 117 or voice recognition. The processor 101 processes the data and instructions and the results may be displayed on a display device 119.

Figure 3A:
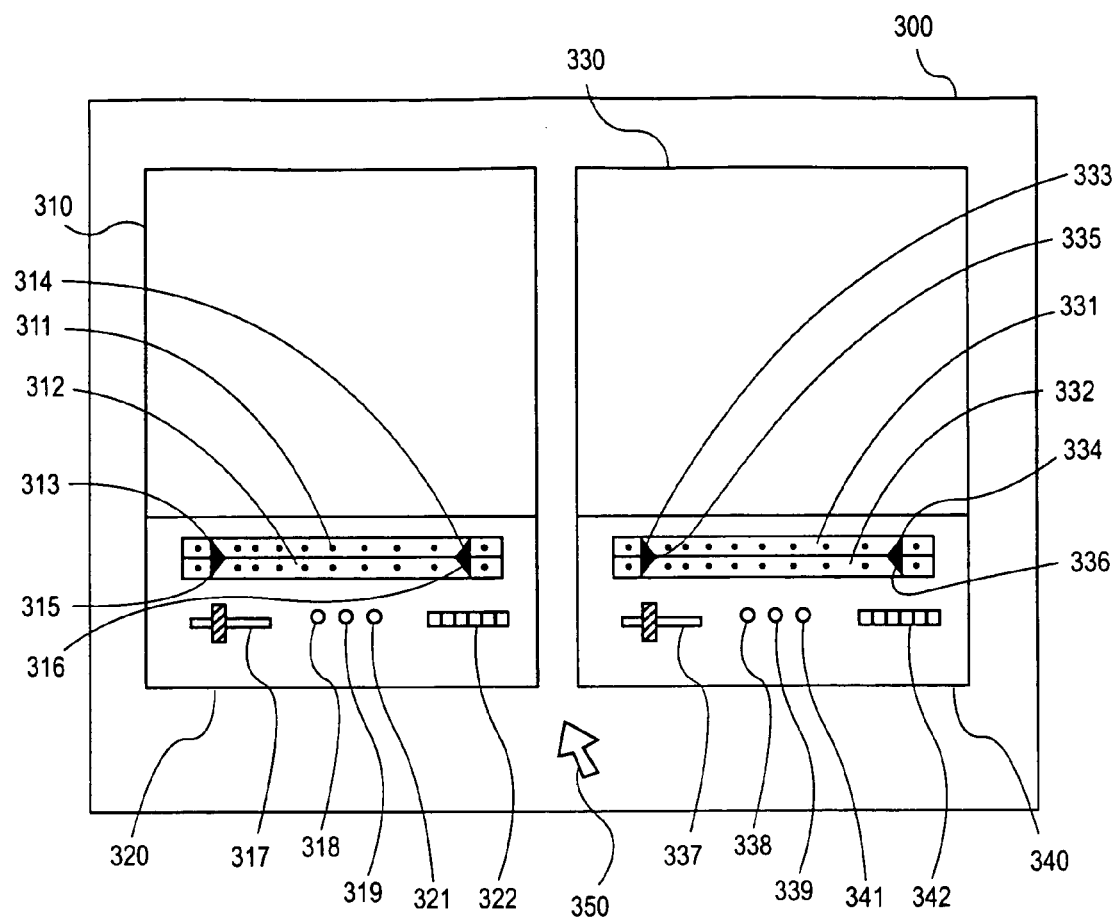
FIG. 3a is a diagram of a Graphics User Interface (GUI) that may be used with an embodiment of the invention.
Figure 3B:
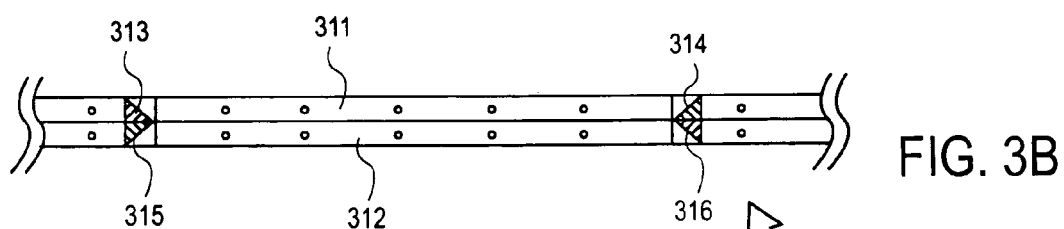
FIGS. 3b-3c illustrate a split edit being performed on two timelines in accordance with an embodiment of the invention.

FIG. 3a is an example of a graphics user interface (GUI) 300 that may be used with an embodiment of the invention. However, other user interfaces may be used according to a desired result by the designer. The GUI 300 is displayed on a display device 119 (See FIG. 2a) and aids the user in controlling the flow of data and instructions to the processor 101. Typically, the GUI 300 comprises a plurality of windows, some which may be opened by the processor 101 in accordance with data and instructions and some which may be opened by the user. The figure illustrates two windows 310, 330. Window 310 is a viewer that performs as a source monitor in which various clips containing time based stream of information can be loaded. The loaded time based stream of information can be, but not limited to, a plurality of video clips, a plurality of video and audio clips, or a plurality of audio clips. Once loaded, editing can be performed on the time based stream of information using a control panel 320 located at the bottom of the window 310. The control panel 320 comprises a plurality of timelines 311, 312 wherein each timeline keeps track of the chronological sequence of one loaded time based stream of information. For instance, a video clip and a corresponding audio clip are loaded into the window 310. A first timeline 311 represents the chronological sequence of the loaded video clip and a second timeline 312 represents the chronological sequence of the audio clip. Each timeline 311, 312 includes two edit pointers 313, 314, 315, 316 that are used to edit the in points and the out points of the time based stream of information represented by the timelines 311, 312. The manipulation of the edit pointers 313, 314, 315, 316 can be performed by the pointing arrow 350. The pointing arrow 350 is operated by the user through the I/O device such as the cursor control device 117 (e.g., a mouse or a trackball) or the alphanumeric device 113 or by speech recognition. Referring to FIG. 3b, two timelines 311, 312 are illustrated with their respective two edit pointers 313, 314, 315, 316. The initial position of the pointers 313, 314, 315, 316 can be positioned on the timelines 311, 312 by the processor 101 when the timelines 311, 312 are displayed. Alternatively, the user can select the initial position of the edit pointers 313, 314, 315, 316 by using the pointing arrow 350.

Figure 3C:
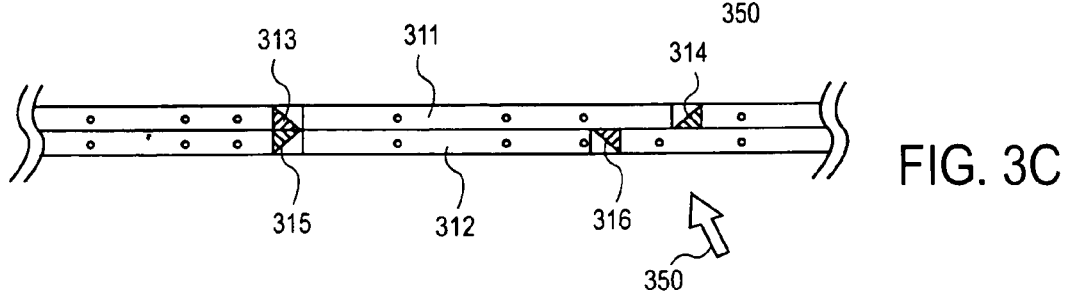

FIG. 3c illustrates the two timelines being edited together in accordance with an embodiment of the invention. Once the edit pointers 313, 314, 315, 316 are displayed on the timelines 311, 312, the user can manipulate individually the position of the edit pointers 313, 314, 315, 316 by placing the pointing arrow 350 on the edit pointer desired to be moved; holding down a button located on the mouse; dragging the pointer to the desired position; and releasing the button. Additionally, the user can move two edit pointers at a time by placing the pointing arrow 350 between two in point edit pointers 313, 315 or two out point edit pointers 314, 316. The figure illustrates the position of the edit pointers 313, 314, 315, 316 moved in the manner as described above. The in point edit pointers 313, 315 have been moved together to a new position that is latter in the timeline than its previous position. The out point edit pointer 316 of the lower timeline has been moved earlier in the timeline than its previous position. Between the two timelines the time duration differs and a split edit has occurred.

Turning back to FIG. 3a, the control panel 320 of the above example further comprises a play icon 319, a reverse icon 318, and a forward icon 321. These icons are used to play the time based stream of information or move the position of the playhead backward or forward within the timeline. The control panel 320 also comprises a jog control icon 322 to jog one frame at a time and a shuttle control 317 that adjusts the frame speed of the video.

The second window 330 is a canvas window that performs as a destination monitor in which the results of the edited time based stream of information are transferred to. At the bottom of the second window 330 is a second control panel 340 that is similar to the one displayed in window 310. The second control panel 340 comprises a plurality of timelines 331, 332 that keep the chronological sequence of the respective time based stream of information. Within each timeline 331, 332, there are two edit pointers 333, 334, 335,.336, each pointer being able to be manipulated by the pointing arrow 350. The control panel 340 also comprises a play icon 339, a reverse icon 338, and a forward icon 341 used to play the time based stream of information or move the position of the playhead backward or forward within the timeline respectively. The control panel 340 further comprises a jog control icon 342 to jog one frame at a time and a shuttle control icon 337 that adjusts the frame speed of the video.

Figure 4:
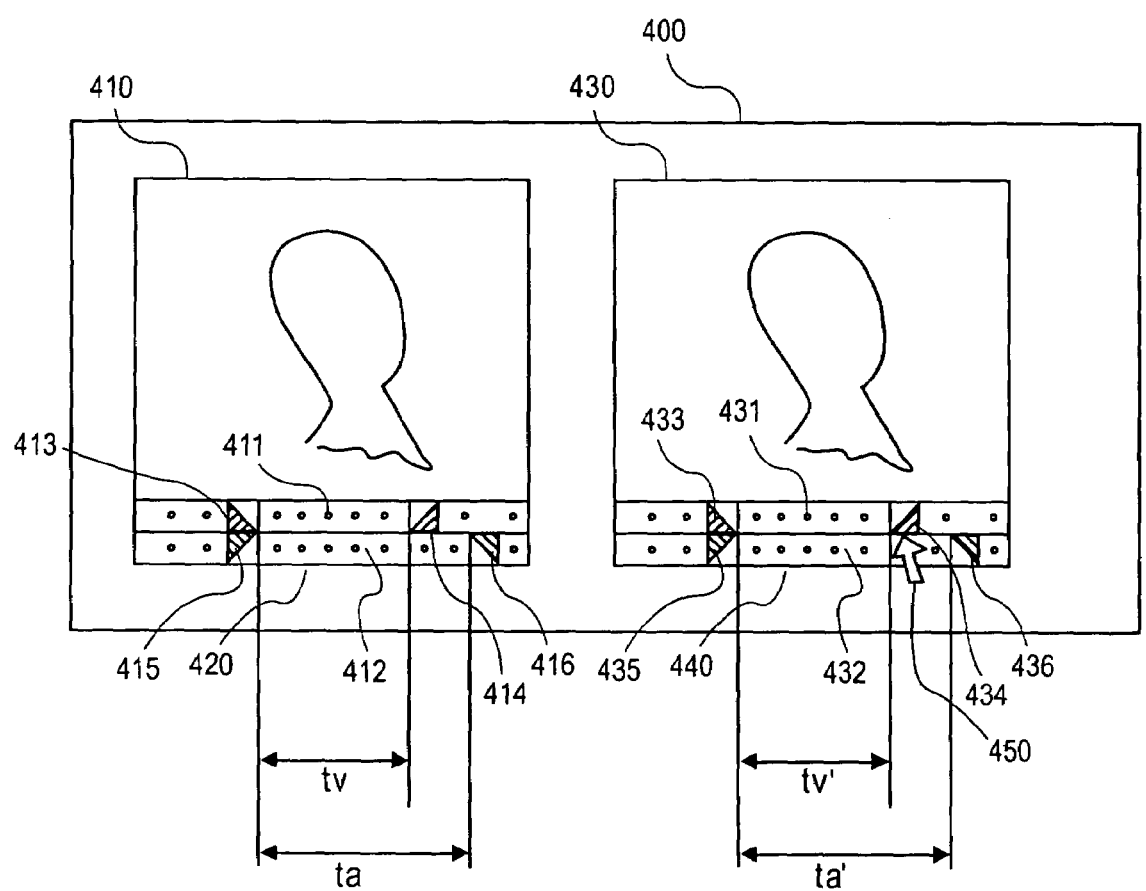
FIG. 4 illustrates a GUI in which a split edit is being performed in accordance with one embodiment of the invention.

FIG. 4 illustrates a split edit in accordance with an embodiment of the invention. According to the embodiment, in a GUI 400, a viewer window 410 and a canvas window 430 are displayed. Various icons of the respective control panels 420, 440 have not been shown as not to obscure the embodiment and only the respective timelines 411, 412, 431, 432 are shown. Using the example mentioned previously to aid in the understanding of the invention, the viewer window 410 displays a clip of a critic explaining certain motions of a dance choreography. The first timeline 411 of the viewer window corresponds to the video feature of the clip and the second timeline 412 of the viewer window 410 corresponds to the audio feature of the clip. The canvas window 430 displays a clip of the actual dancing choreography the critic is commenting on.

Similarly, the first timeline 431 of the canvas window 430 corresponds to the video feature of the clip and the second timeline 432 of the canvas window 430 corresponds to the audio feature of the clip. It is desired that when the critic starts to comment on certain sequence of the dance movements, the video of the critic be replaced by the actual video of the dance movements while the comment made by the critic continues. As the critic is finished with the comment, the audio be replaced by the audio corresponding to the dance movements. In this example, the video in point 413 and the audio in point 415 are positioned, using the pointing arrow 450, in the respective timelines 411, 412 in which the video and the audio clips are to start. The pointing arrow 450 is then moved to position the video out point 414 in which the critic is about to comment on the particular dance movement. The pointing arrow 450 is moved once more to position the audio out point 416 in which the critic finishes making the comment on the movement.

In one embodiment, the pointing arrow 450 is then moved to one of the video in 413, video out 414, audio in 415 and audio out 416 points, latched onto the point, and the point is dragged to the respective timeline on the canvas window 430. In the figure, the pointing arrow 450 has latched onto the video out point 414 of the viewer window 410 and has dragged the point to a position on the first timeline 431 of the canvas window 430 which is now the video out point 434. The remaining points 413, 415, 416 move in unison with the dragged point 414. The time duration tv, ta of the video points 413, 414 and audio points 415, 416 in the viewer window 410 does not change during the transfer. Stated differently, the transferred time duration tv', ta' of the canvas window 430 is the same duration as in the time duration tv, ta of the viewer window 410. The video and audio clips on the canvas window 430 shift or are overwritten to accommodate the inserted video and audio clips of the viewer window 410. The editing described above is now referred to as five point editing. In another embodiment, the pointing arrow 450 is merely moved to the canvas window 430. Using the pointing arrow 350, at least one of video in, video out, audio in and audio out is selected on the timelines 431, 432. Once selected, the processor 101 (see FIG. 2a) calculates the remaining point positions on the timelines 431, 432 using the selected point or points as reference. The calculation can be performed through cross referencing because the time duration of the edited video points and the edited audio points of the viewer window do not change during the transfer to the canvas window. FIG. 4 illustrates the final result of the edit with the remaining transferred points or calculated points 433, 435, 436 shown in broken lines.

Figure 5:
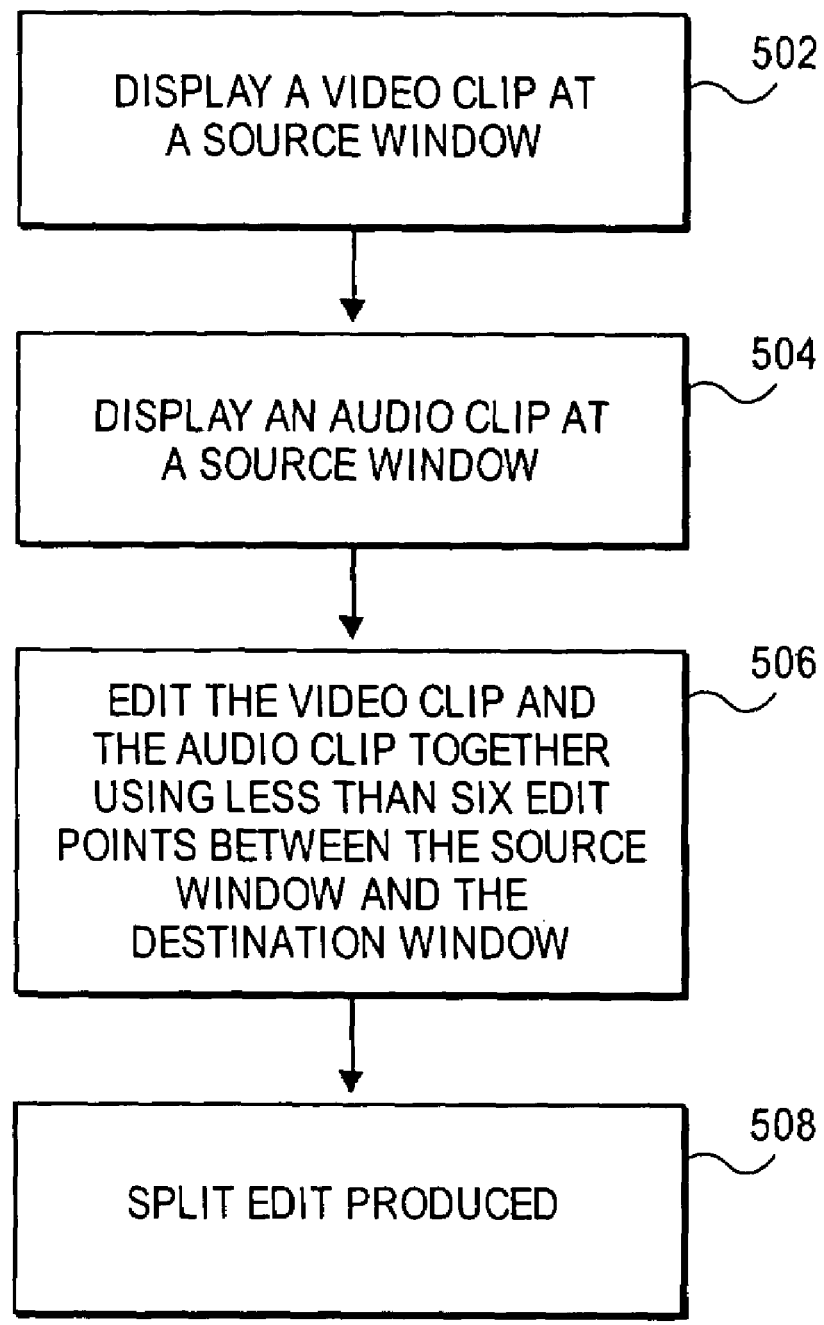
FIG. 5 is flowchart of a method of producing a split edit in accordance with one embodiment of the invention.

FIG. 5 is a flowchart corresponding to an embodiment of the invention. In block 502, a video clip to be edited is represented as a timeline on a source window. In block 504, an audio clip to be edited is represented as a second timeline on the source window. At a destination window, there exists a timeline corresponding to a video clip in which the edited video clip of the source window is to be inserted. There also exists a second timeline corresponding to an audio clip in which the edited audio clip of the source window is to be inserted. In block 506, the video clip and the audio clip are edited together using no more than six edit points between the source window and the destination window. An example of an editing using five edit points has been described with respect to FIG. 4. In block 508, a split edit has been performed between the video clip and the audio clip.

Figure 6:
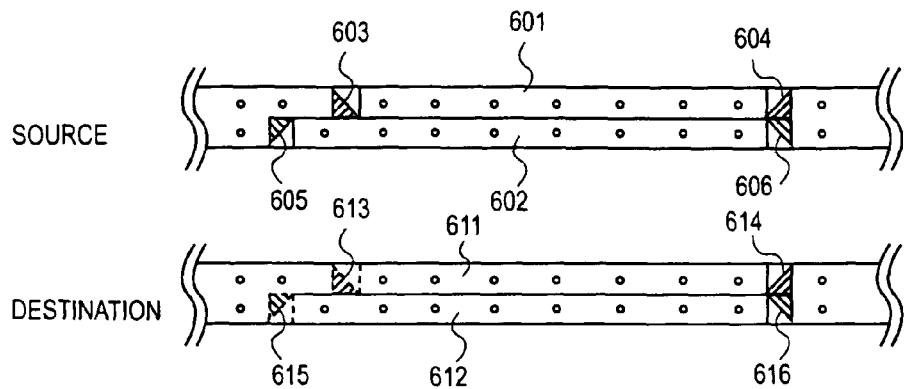
FIGS. 6-9 illustrate various examples of no more than six point edits between a source media and a destination media combined in accordance with an embodiment of the invention.
Figure 7:
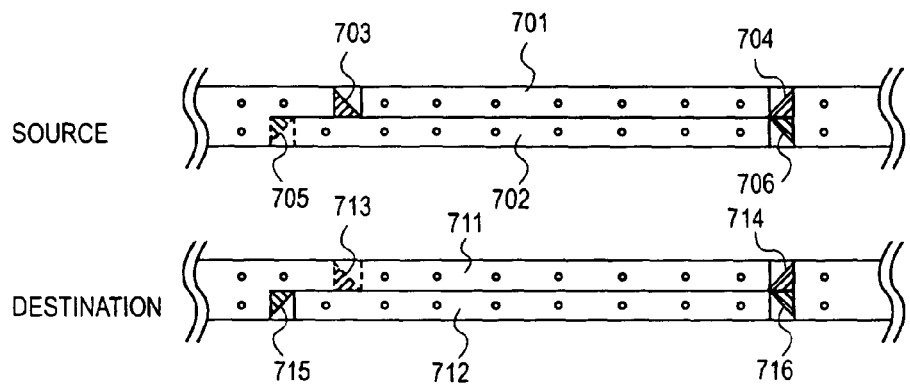
Figure 8:
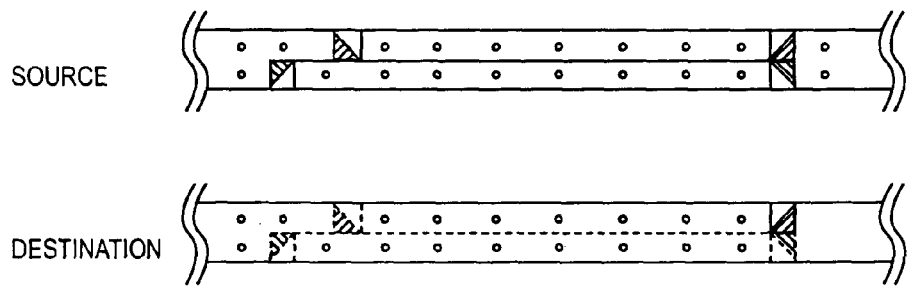
Figure 9:
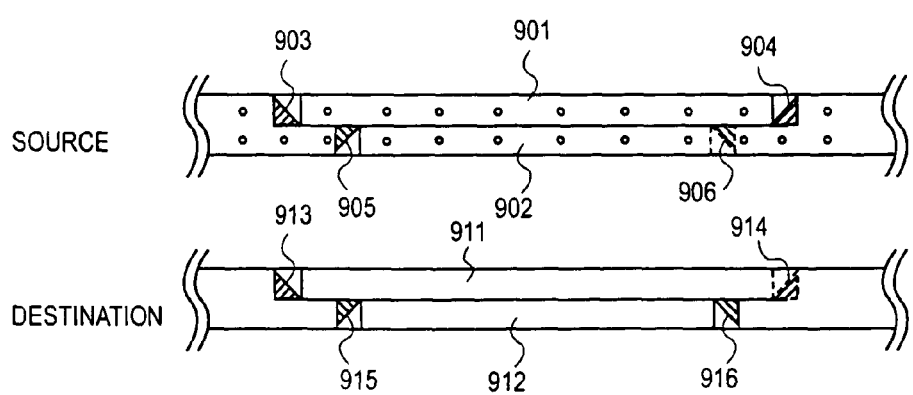

FIGS. 6-9 illustrate various examples of editing that can be performed in accordance with the embodiments of the invention. FIGS. 6 and 7 illustrate examples of a four point editing. FIG. 8 illustrates an example of a five point editing which has been described above. FIG. 9 illustrates an example of a six point editing. Turning now to FIG. 6, on the source side, two timelines 601, 602 are illustrated. Because the video out point 604 and audio out point 606 occur at the same point on the timelines 601, 602, the video out point 604 and the audio out point 606 can be positioned together using one edit point. The video in point 603 and the audio in point 605 occur at different points on the timelines 601, 602, thus, video in point 603 is positioned on the video timeline 601 using one edit point and the audio in point 605 is positioned on the audio timeline 602 using another edit point. Turning to the destination side, the selection of the video out point 614 and the audio out point 616 on the destination side can be performed using one edit point because the two points occur at the same point on the timelines. The video in point 613 and the audio in point 615 can be implicitly calculated because the time duration between the in and out points do not change during transfer from the source side to the destination side. The video in point 513 and the audio in point 615 on the destination side are shown in broken lines. FIG. 7 is another example of a four point edit. Two timelines 701, 702 are illustrated on the source side. Because the video out point 704 and audio out point 706 occur at the same point in the timelines 701, 702, the video out point 704 and the audio out point 706 can be positioned together using one edit point. However, only the video in point 703 is positioned on the source side. Turning now to the destination side, the video out point 714 and the audio out point 716 are positioned together on the timelines 711, 712 using one edit point. However, only the audio in point 715 is positioned on the destination side. Again, because the time duration of the in and out points do not change, the audio in point 705 on the source side and the video in point 713 on the destination side are implicitly calculated. The audio in point 705 on the source side and the video in point 713 on the destination side are shown in broken lines.

FIG. 9 is an example of a six point edit. Video in point 903, video out point 904 and audio in point 905 at the source side are positioned using three edit points. At the destination side, video in point 913, audio in point 915 and audio out point 916 are positioned using three edit points. Because the time duration of the in and out points do not change, the audio out point 906 and the video out point 914 can be implicitly calculated. The audio out point 906 on the source side and the video out point 914 on the destination side are shown in broken lines.

It should be appreciated that the examples given above should not be construed as being conclusive and other variations can be contemplated given the above examples.

Figure 10:
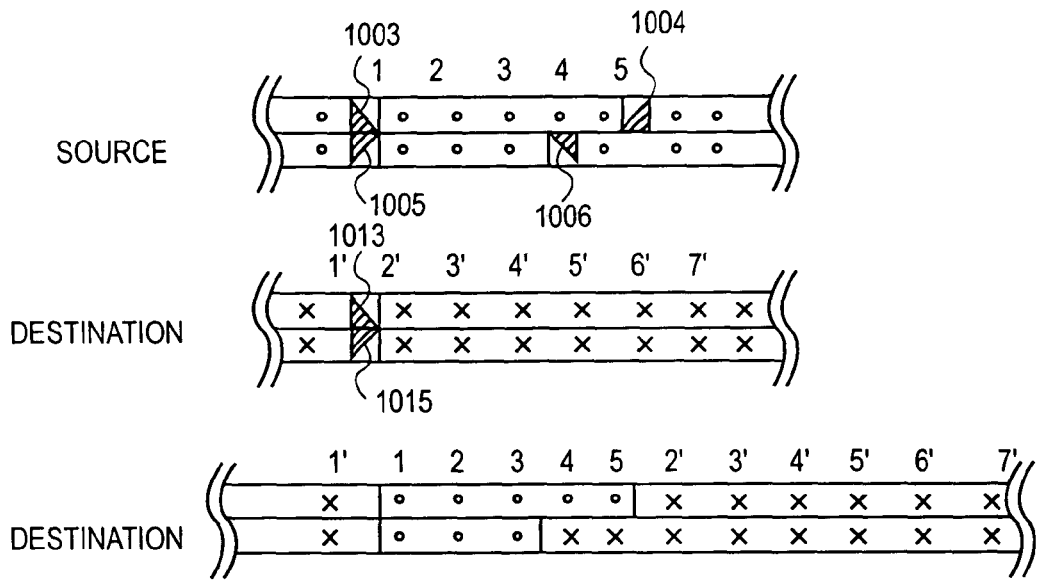
FIG. 10 illustrates an example of an insert edit in accordance with an embodiment of the invention.
Figure 11:
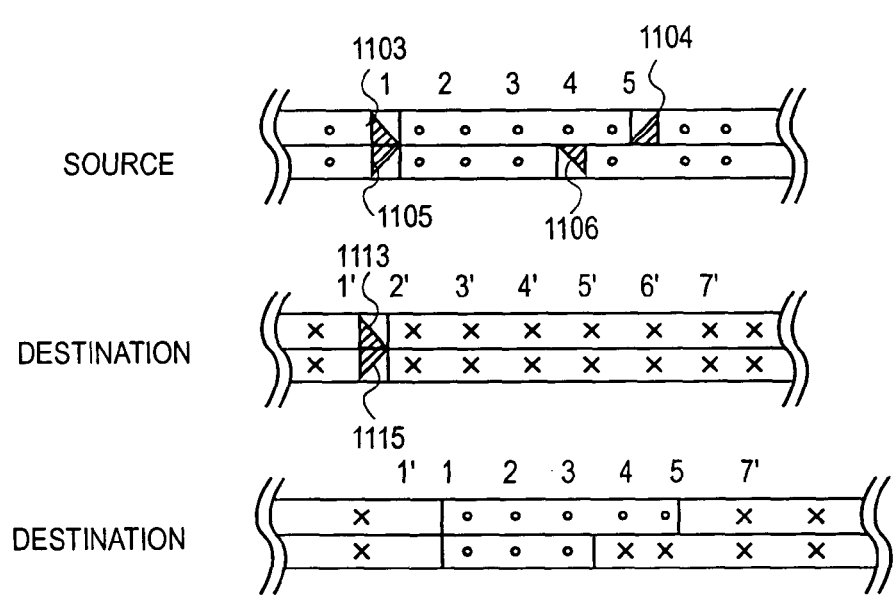
FIG. 11 illustrates an example of an overwrite edit in accordance with an embodiment of the invention.

FIGS. 10-11 illustrate two forms of edit that may be performed on the video and audio clips at the destination side when the edited video and audio clips from the source side are inserted. Turning to FIG. 10, the figure illustrates an example of an insert edit. Once the video in point 1003, video out point 1004, audio in point 1005 and audio out point 1006 are positioned, the edited video and audio clips are transferred be inserted at the video in point 1013 and audio in point 1015 on the destination side. As the edited video and audio clips from the source side are inserted, the video and audio clips of the destination side shift forward in time at the point of insertion thereby no information is lost.

FIG. 11 illustrates an example of an overwrite edit. The edited video and audio clips designated by in and out points 1103, 1104, 1105, 1106, are transferred from the source side to be inserted at the video in point 1113 and audio in point 1115 at the destination side. In this instance, the inserted video and audio clips from the source side overwrites a portion of the video and audio clips on the destination side equal to the time duration of the inserted video and audio clips. The overwritten portions of the video and audio clips on the destination side are lost.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. A method to edit time based streams of information, the method comprising:

displaying together a first indicia of a first time based stream of information and a second indicia of a second time based stream of information, the first and second time based streams of information being correlated with each other in time;

displaying a plurality of edit point markers together with the first indicia and the second indicia, the plurality of markers defining a first selected amount of time of the first time based stream of information and a second selected amount of time of the second time based stream of information, the plurality of markers being adjustable in response to user input so that the first selected amount of time is different from the second selected amount of time; and editing a third time based stream of information and a fourth time based stream of information according to the plurality of markers to include the first selected amount of time of the first time based stream of information and the second selected amount of time of the second time based stream of information in the third and fourth time based streams of information respectively.

2. The method of claim 1, wherein the first time based stream of information overlaps at least partially in time with the second time based stream of information.

3. The method of claim 2, wherein the first selected amount of time of the first time based stream of information overlaps at least partially in time with the second selected amount of time of the second time based stream of information.

4. The method of claim 2, further comprising:

displaying a third indicia of the third time based stream of information and a fourth indicia of the fourth time based stream of information together with the first indicia and the second indicia and the plurality of markers.

5. The method of claim 4, wherein the plurality of markers defines a plurality of edit points in the first, second, third and fourth time based streams of information; the plurality of edit points defines the first selected amount of time, the second selected amount of time, and positions in the third and fourth time based streams of information in which the first selected amount of time of the first time based stream of information and the second selected amount of time of the second time based stream of information are included.

6. The method of claim 5, wherein the plurality of markers comprise less than six individually adjustable markers.

7. The method of claim 4, further comprising:
determining the first selected amount of time using one of the plurality of markers, the one of the plurality of markers being on one of: the second, third and fourth indicia.

8. The method of claim 7, wherein the one of the plurality of markers defines an edit point on the third indicia.

9. The method of claim 1, wherein the first and second time based streams of information are from one source media; the first time based stream of information comprises audio information; and, the second time based stream of information comprises video information.

10. The method of claim 1, wherein said editing is in one operation.

11. The method of claim 1, wherein said editing comprises:
replacing a portion of the third and fourth time based streams of information with a corresponding portion of the first selected amount of time of the first time based stream of information and the second selected amount of time of the second time based stream of information.

12. The method of claim 1, wherein said editing comprises:
inserting the first selected amount of time of the first time based stream of information and the second selected amount of time of the second time based stream of information into the third and fourth time based streams of information respectively without overwriting a portion of the third and fourth time based streams of information.

13. A machine readable medium containing executable computer program instructions which when executed by a data processing system cause said system to perform a method to edit time based streams of information, the method comprising:
displaying together a first indicia of a first time based stream of information and a second indicia of a second time based stream of information, the first and second time based streams of information being correlated with each other in time;
displaying a plurality of edit point markers together with the first indicia and the second indicia, the plurality of markers defining a first selected amount of time of the first time based stream of information and a second selected amount of time of the second time based stream of information, the first selected amount of time being different from the second selected amount of time; and
editing a third time based stream of information and a fourth time based stream of information according to the plurality of markers to include the first selected amount of time of the first time based stream of information and the second selected amount of time of the second time based stream of information in the third and fourth time based streams of information respectively.

14. The medium of claim 13, wherein the first time based stream of information overlaps at least partially in time with the second time based stream of information.

15. The medium of claim 14, wherein the first selected amount of time of the first time based stream of information overlaps at least partially in time with the second selected amount of time of the second time based stream of information.

16. The medium of claim 14, wherein the method further comprises:
displaying a third indicia of the third time based stream of information and a fourth indicia of the fourth time based stream of information together with the first indicia and the second indicia and the plurality of markers.

17. The medium of claim 16, wherein the plurality of markers defines a plurality of edit points in the first, second, third and fourth time based streams of information; the plurality of edit points defines the first selected amount of time, the second selected amount of time, and positions in the third and fourth time based streams of information in which the first selected amount of time of the first time based stream of information and the second selected amount of time of the second time based stream of information are included.

18. The medium of claim 17, wherein the plurality of markers comprise less than six individually adjustable markers.

19. The medium of claim 16, wherein the method further comprises:
determining the first selected amount of time using one of the plurality of markers, the one of the plurality of markers being on one of: the second, third and fourth indicia.

20. The medium of claim 19, wherein the one of the plurality of markers is displayed for the third time based stream of information.

21. The medium of claim 13, wherein the first and second time based streams of information are from one source media; the first time based stream of information comprises audio information; and, the second time based stream of information comprises video information.

22. The medium of claim 13, wherein said editing is in response to one user input.

23. The medium of claim 13, wherein said editing replaces a portion of the third and fourth time based streams of information with a corresponding portion of the first selected amount of time of the first time based stream of information and the second selected amount of time of the second time based stream of information.

24. The medium of claim 13, wherein said editing inserts the first selected amount of time of the first time based stream of information and the second selected amount of time of the second time based stream of information into the third and fourth time based streams of information respectively without overwriting a portion of the third and fourth time based streams of information.

25. A data processing system to edit time based streams of information, the data processing system comprising:
means for displaying together a first indicia of a first time based stream of information and a second indicia of a second time based stream of information, the first and second time based streams of information being correlated with each other in time;
means for displaying a plurality of edit point markers together with the first indicia and the second indicia, the plurality of markers defining a first selected amount of time of the first time based stream of information and a second selected amount of time of the second time based stream of information;
means for adjusting the plurality of markers in response to user input so that the first selected amount of time is different from the second selected amount of time; and
means for editing a third time based stream of information and a fourth time based stream of information according to the plurality of markers to include the first selected amount of time of the first time based stream of information and the second selected amount of time of the second time based stream of information in the third and fourth time based streams of information respectively.

26. The data processing system of claim 25, wherein the first time based stream of information overlaps at least partially in time with the second time based stream of information.

27. The data processing system of claim 26, wherein the first selected amount of time of the first time based stream of information overlaps at least partially in time with the second selected amount of time of the second time based stream of information.

28. The data processing system of claim 26, further comprising:
    means for displaying a third indicia of the third time based stream of information and a fourth indicia of the fourth time based stream of information together with the first indicia and the second indicia and the plurality of markers.

29. The data processing system of claim 28, wherein the plurality of markers defines a plurality of edit points in the first, second, third and fourth time based streams of information; the plurality of edit points defines the first selected amount of time, the second selected amount of time, and positions in the third and fourth time based streams of information in which the first selected amount of time of the first time based stream of information and the second selected amount of time of the second time based stream of information are included.

30. The data processing system of claim 29, wherein the plurality of markers comprise less than six individually adjustable markers.

31. The data processing system of claim 28, further comprising:
    means for determining the first selected amount of time using one of the plurality of markers, the one of the plurality of markers being on one of: the second, third and fourth indicia.

32. The data processing system of claim 31, wherein the one of the plurality of markers defines an edit point on the third indicia.

33. The data processing system of claim 25, wherein the first and second time based streams of information are from one source media; the first time based stream of information comprises audio information; and, the second time based stream of information comprises video information.

34. The data processing system of claim 25, wherein said means for editing edits the third and fourth time based streams of information together.

35. The data processing system of claim 25, wherein said means for editing replaces a portion of the third and fourth time based streams of information with a corresponding portion of the first selected amount of time of the first time based stream of information and the second selected amount of time of the second time based stream of information.

36. The data processing system of claim 25, wherein said means for editing inserts the first selected amount of time of the first time based stream of information and the second selected amount of time of the second time based stream of information into the third and fourth time based streams of information respectively without overwriting a portion of the third and fourth time based streams of information.

* * * * *